No. 641,603. Patented Jan. 16, 1900.
F. J. NEWMAN & J. LEDWINKA.
ELECTRICALLY PROPELLED VEHICLE.
(Application filed Sept. 1, 1899.)
(No Model.)
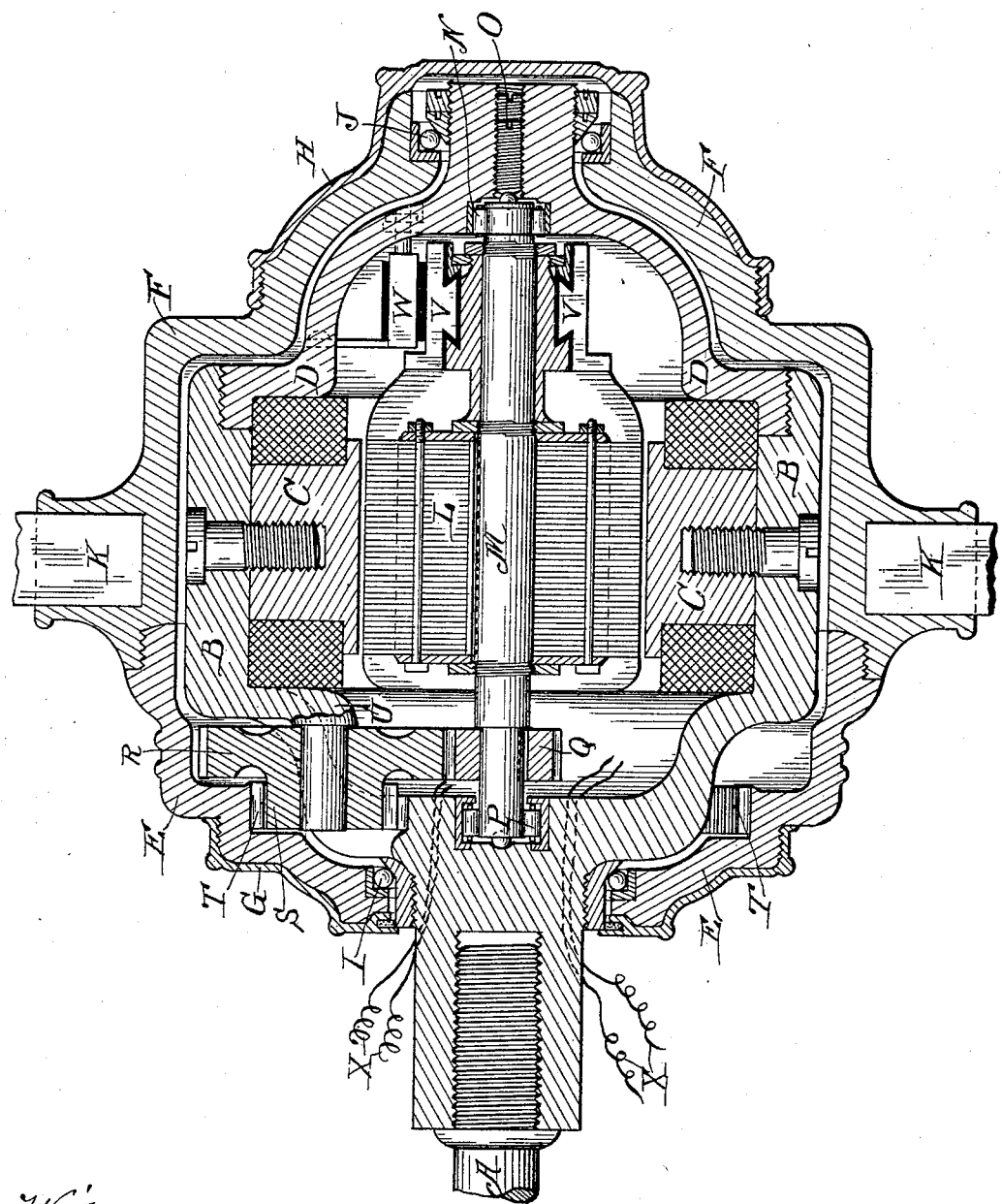
Witnesses:
Inventors:

UNITED STATES PATENT OFFICE.

FREDERICK J. NEWMAN AND JOSEPH LEDWINKA, OF CHICAGO, ILLINOIS.

ELECTRICALLY-PROPELLED VEHICLE.

SPECIFICATION forming part of Letters Patent No. 641,603, dated January 16, 1900.

Application filed September 1, 1899. Serial No. 729,252. (No model.)

*To all whom it may concern:*

Be it known that we, FREDERICK JACOB NEWMAN, a citizen of the United States, and JOSEPH LEDWINKA, a subject of the Emperor of Austria-Hungary, and both residents of the city of Chicago, county of Cook, and State of Illinois, have invented certain new and useful Improvements in the Art of the Propulsion of Horseless or Similar Vehicles, of which the following is a specification.

Our invention relates to improvements in vehicles driven by electric power and at the same time hiding the electric motor and necessary gearing without changing the appearance of ordinary carriage designs and also covering the motor and gearing, so as to keep water and dust from them. To accomplish this we select the hub of the wheel in which to install and entirely inclose our electric motor with proper gearing so connected with the interior of the hub that when the motor is revolved its motion will be imparted to the hub of the wheel, and thus move the vehicle.

In the drawing, showing the invention, A is a stationary axle of a vehicle, to which is securely fastened the inner part of the motor-field shell B, to which are securely fastened the field-magnet projections C, with their windings, and also the outer motor-field shell D, around which is the hollow hub, which hub is made up of the parts E and F and the caps G and H. Said hollow hub is journaled on the bearings I and J and so arranged that it can revolve about the motor-field.

K are broken spokes of the wheel.

L is the armature, mounted on the shaft M, which shaft is journaled on the bearings N and P.

O are adjustment-screws to adjust the end play of the armature-shaft.

Q is a gear-pinion securely fastened to shaft M.

R and S are intermediate gears fastened securely together and rotating on the bracket U, fastened securely to B and rotating in a slot cut out in field B.

T is an internal gear fastened securely to the interior of the hub-shell E.

Gear Q meshes with gear R and gear S meshes with gear T.

V is the commutator.

W is the brush and holder.

X are the wires carrying the electric current to the motor.

When the current is applied, the motor-armature revolves, carrying with it the pinion Q. This turns gear R, which turns gear S, which turns gear T, and gear T carries with it the hub, thus causing the wheel to revolve and move the carriage. The end of each axle may have a hub and motor of this character, or only one, two, or three may be equipped with a wheel of this sort, depending upon the power required and the kind of vehicle. In the event of all of the wheels not being equipped the remainder should be ordinary wheels of proper dimensions.

Having thus described our invention, what we claim, and desire to secure by Letters Patent, is—

1. A combination of an electric motor mounted on a vehicle-axle, a hollow hub of a vehicle-wheel inclosing said motor, said hub journaled about said motor, the armature of said motor connected with the interior of said hub, so that when said armature is caused to revolve, its revolving motion would be transmitted to the said vehicle-hub.

2. A combination of a hollow hub of a vehicle-wheel inclosing an electric motor, the stationary magnetic field of said motor rigidly fastened to the vehicle-axle, the armature of said motor carrying with it a gear meshing with intermediate gearing properly supported and journaled, said intermediate gearing meshing with an internal gear fastened rigidly to the interior of said hub, thus causing the said hub to rotate when an electric current is applied to said motor.

FRED. J. NEWMAN.
JOSEPH LEDWINKA.

Witnesses:
CHARLES E. BROWN,
CHARLES BERG.